US010127370B2

(12) United States Patent
Zafiris

(10) Patent No.: US 10,127,370 B2
(45) Date of Patent: *Nov. 13, 2018

(54) COMPUTING DEVICE CHORDING AUTHENTICATION AND CONTROL

(71) Applicant: Google Technology Holdings LLC, Mountain View, CA (US)

(72) Inventor: John Zafiris, Hawthorn Woods, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 15/679,218

(22) Filed: Aug. 17, 2017

(65) Prior Publication Data
US 2018/0025142 A1 Jan. 25, 2018

Related U.S. Application Data

(63) Continuation of application No. 14/458,519, filed on Aug. 13, 2014, now Pat. No. 9,740,839.

(51) Int. Cl.
G06F 21/32 (2013.01)
G06F 3/044 (2006.01)
(Continued)

(52) U.S. Cl.
CPC ............ *G06F 21/32* (2013.01); *G06F 1/1671* (2013.01); *G06F 1/1694* (2013.01);
(Continued)

(58) Field of Classification Search
CPC ........ G06F 21/31; G06F 21/316; G06F 21/32; G06F 3/0346; G06F 3/0487; G06F 3/0488
See application file for complete search history.

(56) References Cited

U.S. PATENT DOCUMENTS 7,306,567 B2 12/2007 Loree, IV
7,522,031 B2 4/2009 Lim
(Continued)

FOREIGN PATENT DOCUMENTS

WO 2008033484 A2 3/2008
WO 2008072168 A1 6/2008
WO 2011056657 A2 5/2011

OTHER PUBLICATIONS

Lu et al., "SpeakerSense: Energy Efficient Unobstructive Speaker Identification on Mobile Phones", Proc. of the 9th International Conference on Pervasive Computing, 2011, 18 pp.
(Continued)

*Primary Examiner* — Joseph P Hirl
*Assistant Examiner* — Thomas A Gyorfi
(74) *Attorney, Agent, or Firm* — Shumaker & Sieffert, P.A.

(57) ABSTRACT

Chording techniques are described that may be utilized in a variety of ways to provide inputs to a computing device. The computing device, for instance, may include sensors disposed on a housing of the computing device such that the sensors are configured to detect fingers of a user when grasping the device. Detection of a likely indexed relative position of the fingers of the user's hand in relation to each other, and even an amount of pressure used by respective ones of the fingers, may be used to define and input chords that may be used to initiate operations of the computing device.

17 Claims, 10 Drawing Sheets

(51) Int. Cl.
*G06F 1/16* (2006.01)
*H03K 17/96* (2006.01)
*G06F 3/023* (2006.01)

(52) U.S. Cl.
CPC ............ *G06F 3/0235* (2013.01); *G06F 3/044* (2013.01); *H03K 17/9622* (2013.01); *G06F 2200/1637* (2013.01); *G06F 2203/0339* (2013.01)

(56) References Cited

U.S. PATENT DOCUMENTS

| | | |
|---|---|---|
| 7,800,592 B2 | 9/2010 | Kerr et al. |
| 7,877,707 B2 | 1/2011 | Westerman et al. |
| 7,999,855 B2 | 8/2011 | Grosvenor |
| 8,075,499 B2 | 12/2011 | Nathan et al. |
| 8,115,875 B2 | 2/2012 | Takuma |
| 8,234,512 B2 | 7/2012 | Mucignat et al. |
| 8,564,544 B2 | 10/2013 | Jobs et al. |
| 2004/0214146 A1 | 10/2004 | Harris et al. |
| 2006/0053315 A1 | 3/2006 | Menzl |
| 2008/0215901 A1 | 9/2008 | Beard |
| 2009/0102803 A1* | 4/2009 | Newman ................ G06F 21/31 345/173 |
| 2009/0164219 A1 | 6/2009 | Yeung et al. |
| 2009/0244031 A1* | 10/2009 | Westerman ........... G06F 3/0235 345/174 |
| 2009/0249236 A1 | 10/2009 | Westerman et al. |
| 2010/0033422 A1 | 2/2010 | Mucignat et al. |
| 2010/0235746 A1 | 9/2010 | Anzures |
| 2010/0313050 A1 | 12/2010 | Harrat et al. |
| 2011/0050428 A1 | 3/2011 | Istoc |
| 2011/0080349 A1 | 4/2011 | Holbein et al. |
| 2011/0264928 A1 | 10/2011 | Hinckley |
| 2012/0007713 A1 | 1/2012 | Nasiri et al. |
| 2012/0016641 A1 | 1/2012 | Raffa et al. |
| 2012/0075248 A1 | 3/2012 | Chang et al. |
| 2012/0140451 A1 | 6/2012 | Araujo et al. |
| 2012/0154313 A1 | 6/2012 | Au et al. |
| 2013/0113723 A1 | 5/2013 | Chen et al. |
| 2013/0162600 A1 | 6/2013 | Chou et al. |
| 2013/0197681 A1 | 8/2013 | Alberth, Jr. et al. |
| 2013/0234924 A1 | 9/2013 | Janefalkar et al. |
| 2013/0278552 A1 | 10/2013 | Kamin-Lyndgaard |
| 2014/0111429 A1 | 4/2014 | Layton |
| 2014/0208128 A1 | 7/2014 | Gyorfi et al. |
| 2014/0208333 A1 | 7/2014 | Beals et al. |
| 2015/0135108 A1 | 5/2015 | Pope et al. |

OTHER PUBLICATIONS

Prosecution History from U.S. Appl. No. 14/458,519, dated Jun. 2, 2015 through Apr. 14, 2017, 41 pp.

* cited by examiner

COMPUTING DEVICE CHORDING AUTHENTICATION AND CONTROL

This application is a continuation of U.S. application Ser. No. 14/458,519, filed Aug. 13, 2014, the entire contents of which are hereby incorporated by reference.

BACKGROUND

Computing devices such as mobile phones and tablets are becoming an ever increasing part of a user's day. As such, a typical user may interact with the computing device tens and even hundreds of times on any given day to check email, surf the web, write or read a text message, and so on.

Because the computing device has become so closely integrated with the user, techniques have been developed to protect the computing device from malicious parties. Conventional techniques, for instance, may include use of a PIN, drawing of a unique pattern, and so on. These conventional techniques, however, may involve a signification amount of interaction, thereby hindering user access to the device, especially when compounded by the tens and hundreds of times a user may wish to interact with the device. Further, these conventional techniques may be susceptible to snooping, such that a malicious party may simply observe entry of the PIN or pattern into the device (e.g., "over the shoulder" of the user) in order to gain access to the device at a later point in time.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
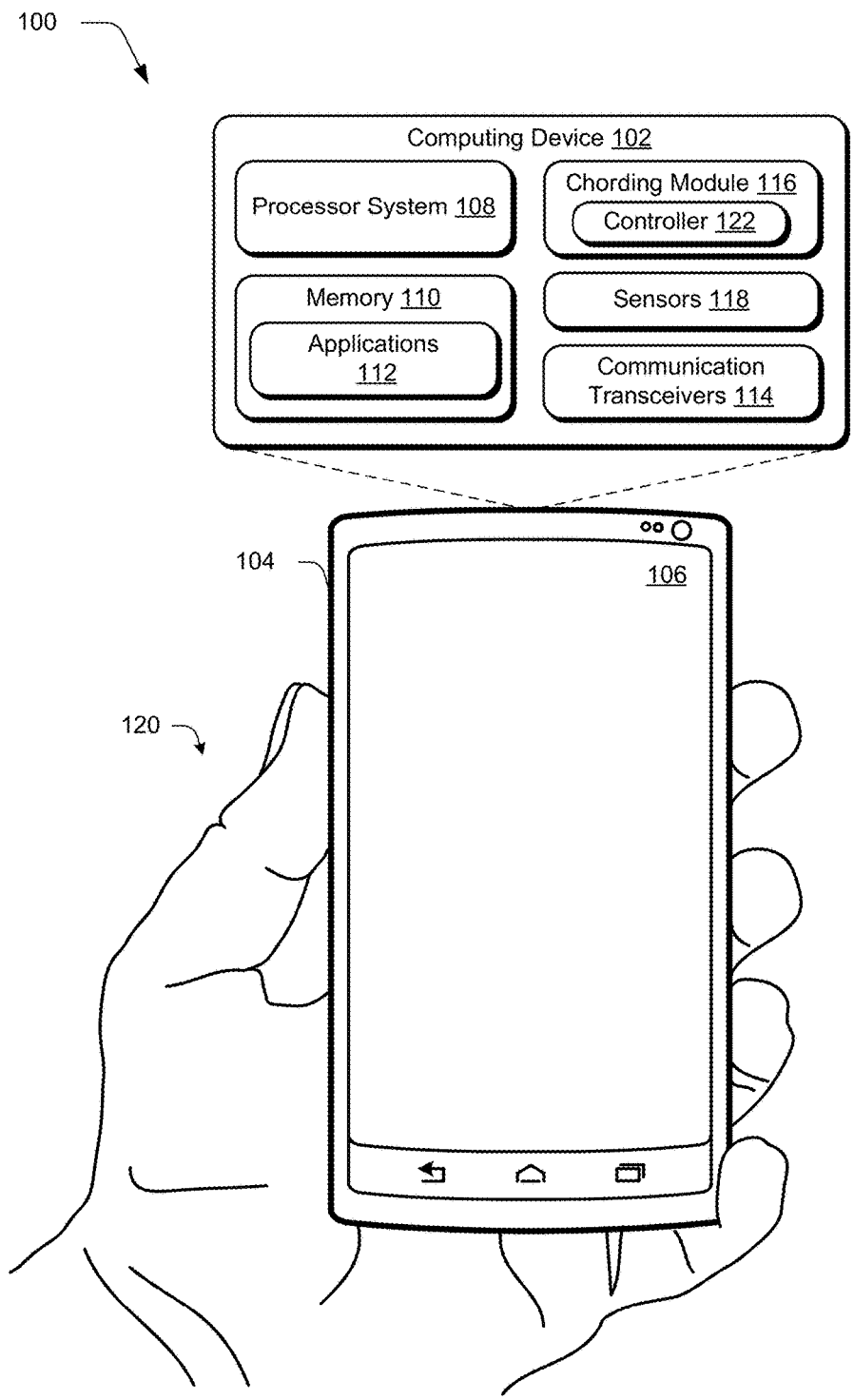
FIG. 1 is an illustration of an environment in an example implementation that is operable to employ computing device chording techniques described herein.

Computing devices may support a wide variety of input functionality. For example, mobile computing devices such as mobile phones and tablets typically employ a display device having touchscreen functionality. To unlock the mobile computing device, conventional techniques may employ a PIN or a unique pattern that is entered via the touchscreen functionality to gain access to the device. These conventional techniques, however, may be involved (e.g., require manual entry of a relatively long sequence of numbers or unique pattern) or expensive (a fingerprint sensor) and also may be susceptible to snooping by malicious parties by simply watching a user enter this information.

Chording techniques are described that may be utilized in a variety of ways to provide inputs to a computing device. The computing device, for instance, may include sensors (e.g., capacitive sensors) disposed on a housing of the computing device, e.g., along both sides of the housing, such that the sensors are configured to detect fingers of a user when grasping (e.g., holding) the device, or embedded in a separate case accessory surrounding the device and may do so with a low implementation cost. Detection of relative index position of the fingers of the user's hand in relation to each other, and even an amount of pressure used by respective ones of the fingers, may be used to define and input chords. For example, the techniques described herein may consider an index corresponding to a spacing of a missing finger and inter-digit threshold to detect chords which have a lifted finger in addition to the relative position.

For example, a user may grip the housing using different combinations of fingers and amounts of pressure for those fingers to define individual ones of a sequence of chords. The chords may then be identified by the computing device and utilized to initiate a variety of different operations of the computing device. Examples of such operations include unlocking the computing device, launching an application, initiating an emergency call, and so forth. Additionally, these inputs may be provided by a user with minimal need to no worry of being detected by a malicious party as the inputs may be provided (e.g., by leveraging haptic feedback) without viewing a user interface. Further, techniques are also described in the following in which the chords may be recognized regardless of the orientation of the computing device (e.g., upside down, backwards), thus further supporting efficient user interaction with the device. A variety of other examples are also contemplated, further discussion of which may be found in relation to the following sections.

In the following discussion, an example environment is described that may employ the chording techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the computing device chording techniques described herein. The environment 100 includes a computing device 102, which may be configured in a variety of ways. For example, a computing device 102 may be configured as a mobile computing device which may include any type of wired or wireless electronic and/or computing device configured to be mobile, such as a wireless phone, tablet computer, handheld navigation device, portable gaming device, media playback device, or any other type of electronic and/or computing device. Other non-mobile examples are also contemplated, such as a traditional desktop PC.

Generally, any of the devices described herein can be implemented with various components, such as a housing 104 having secured thereto a display device 106. The housing 104 may also include disposed therein a processor system 108, an example of a computer-readable storage medium illustrated as memory 110 configured to maintain one or more applications 112 that are executable on the processor system 108, and one or more communication transceivers 114 configured to support wired and/or wireless communication. It should be readily apparent that these are just examples and as such other numbers and combination of differing components are also contemplated as further described with reference to the example device shown in FIG. 11.

The computing device 102 is also illustrated as including a chording module 116. The chording module 116 is representative of functionality of the computing device 102 to recognize inputs and initiate corresponding operations of the computing device 102 involving chords. For example, the computing device 102 may include sensors 118 that are configured to detect a likely relative position of one or more fingers of a user's hand 120 and may even be configured to detect a likely amount of pressure applied by each of the fingers of the user's hand 120 in grasping (e.g., holding) the housing 104 of the computing device 102 as illustrated. Simultaneous collections of these inputs may be recognized as unique chords, e.g., through variation of relative position and/or amount of pressure applied by each finger. In this way, the chords may be utilized by the computing device 102 without involving interaction with touchscreen functionality of the display device 106, although implementations involving interaction with the user interface using chords are also contemplated as further described below.

Recognition of the chords may then be utilized to implement a variety of different functionality. For example, the chording module 116 may include a controller 122 separate from the processor system 108 that consumes less power that may be utilized to detect proximity of an object using the sensors 118. Upon recognition of a particular chord by the chording module 116, the controller 122 may cause the processor system 108 to "wake up" from a sleep/suspended or completely powered off state (e.g., to replace a power button of the computing device 102) and thus may be used to reduce resource consumption of the computing device.

Upon wake up, operation of the chording module 116 may continue, such as to determine whether to authorize a user to access the computing device 102, e.g., through entry of a particular sequence of chords. Other chording functionality may also be supported, such as to initiate emergency operations of the computing device 102 (e.g., dial 911), launch particular applications, initiate communications with particular contacts in a contact list, and so on as further described in the following.

Figure 2:
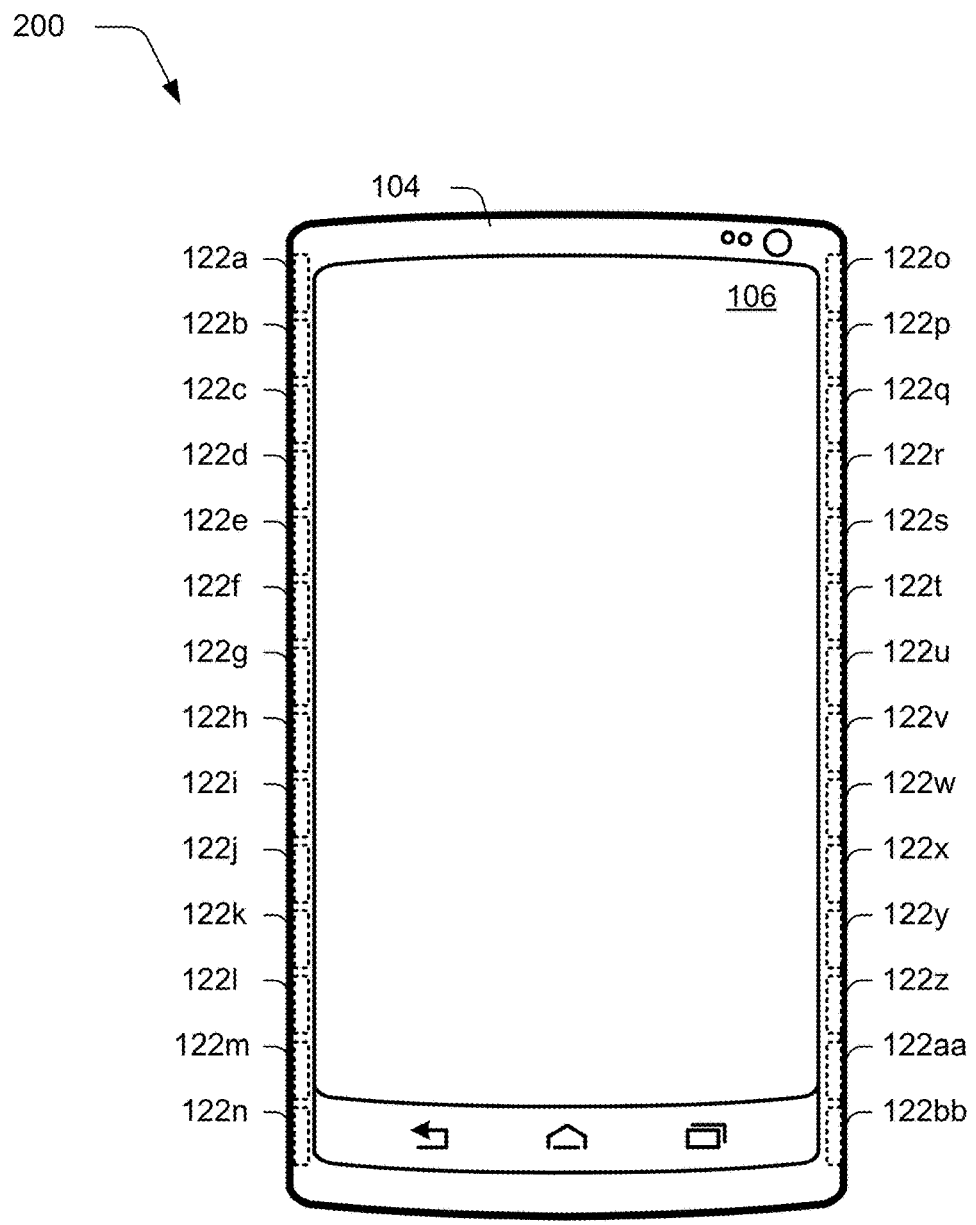
FIG. 2 depicts an example implementation of arrangement of sensors on a housing of the computing device of FIG. 1.

FIG. 2 depicts an example implementation of arrangement of sensors 118 on the housing 104 of the computing device 102. In this example, twenty eight sensors 122a-122bb are illustrated as disposed on the housing around a perimeter of the display device 104, e.g., along opposing sides of the housing 104. Other implementations are also contemplated, such as to include a rear portion of the housing 104, a top and/or bottom side, or any other part of the housing 104 that may be grasped by the hand 120 of the user.

Fourteen sensors 122a-122n are illustrated as arranged along the left side of the housing 104 in the illustration and fourteen sensors 122o-122bb are illustrated as arranged along the right side of the housing 104. This may be utilized to support twenty-eight independent channels, which are able to sense twenty eight simultaneous objects that are disposed proximal to the sensors. Using interpolation, this arrangement may support sub-millimeter finger position resolution. The sensors 122a-122bb may be configured in a variety of ways, an example of which is configured to detect proximity of an object using capacitance (e.g., single or mutual capacitance) although other examples are also contemplated, such as piezoelectric, thermal, resistive, optical, strain sensors, and so forth.

An output of the sensors 122a-122bb may be processed by the chording module 116 to determine a likely position of fingers of the user's hand 120 of FIG. 1 in relation to each other, considering an index corresponding to the spacing of a missing finger and inter-digit threshold to detect chords which have a lifted finger on the ends of the sensitive surfaces. By sensing a relative position of the fingers to each other, a user may grip the housing 104 at different points along the edges (e.g., up or down) in this example yet still provide a chord that is recognizable by the chording module 116. In other words, recognition of a chord may be performed independent of which particular sensors actually sensed the positioning of the fingers by defining a chord as the relative position of the fingers.

The chord may also be defined based on a likely amount of pressure used by individual ones of the fingers in grasping the housing 104. This amount of pressure may be sensed in a variety of ways, such as based on a contact area of the finger in a capacitance example. Thus, a chord may be defined based on both relative position of a user's fingers as well as a likely amount of pressure applied by those fingers, an example of which is described as follows and shown in a corresponding figure.

Figure 3:
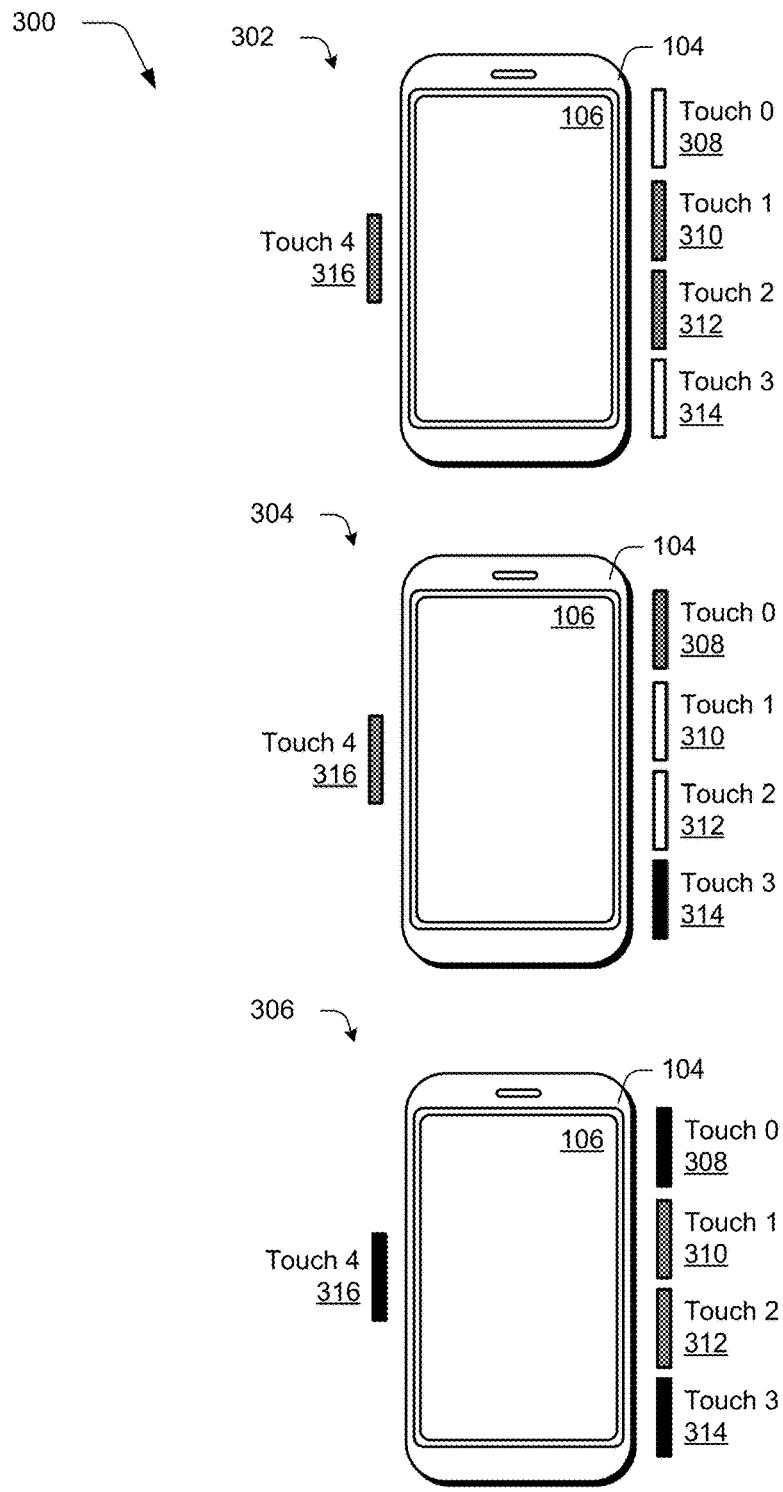
FIG. 3 depicts an example implementation showing a sequence of chords that are recognizable by a chording module of FIG. 1.

FIG. 3 depicts an example implementation 300 showing a sequence of chords that are recognizable by the chording module 116 of FIG. 1. This example is illustrated as including first, second, and third chords 302, 304, 306. Each of the chords includes a relative position of a user's fingers as well as indicates a likely amount of pressure applied by each of those fingers. The amounts of pressure are illustrated as white for "no pressure," gray for "light pressure," and black for "heavy pressure." Accordingly, this may be expressed as a Base 3 code, chorded by N tuples. The number of pressure detected states can be fewer than three or more than three. Three is used in this example.

In the first chord 302, for instance, a user has likely grasped the housing 104 of the computing device 102 using their left hand if viewing the display device 106 and their right hand if not, e.g., the display device 104 rests against the palm of the user's right hand Touch 0 308 is detected as "no pressure," touches 1 and 2 310, 312 as "light pressure," touch 3 314 as "no pressure," and touch 4 316 as "light pressure." Thus, from touches 1, 2, and 4 310, 312, 316 the chording module 116 is able to infer that the housing 104 is being held by the user's thumb, middle, and ring fingers and not being held by an index or pinky finger. This relative positioning and corresponding amounts of pressure may then be recognized as the first chord 302 and encoded as a Base 3 value "010110."

In the second chord 304, touch 0 308 is detected as "light pressure," touches 1 and 2 310, 312 as "no pressure," touch 3 314 as "heavy pressure," and touch 4 316 as "light pressure." Thus, from touches 0, 3, and 4 308, 314, 316 the chording module 116 is able to infer that the housing 104 is being held by the user's thumb, index, and pinky fingers and not being held by the ring and middle fingers. This relative positioning and corresponding amounts of pressure may then be recognized as the second chord 304 and encoded as a Base 3 value "012001."

In the third chord 306, touch 0 308 is detected as "heavy pressure," touches 1 and 2 310, 312 as "light pressure," touch 3 314 as "heavy pressure," and touch 4 316 as "heavy pressure." Thus, in this example the housing is being held by all five fingers of the user's hand 120. This relative positioning and corresponding amounts of pressure may then be recognized as the second chord 306 and encoded as a Base 3 value "022112." Taken together, the three chords are equivalent to a Base 10 value of $49523387_{10}$ ($010110\ 012001\ 022112_3$).

Thus, in this example a user may pick up the housing and then alter relative positioning of fingers and/or amounts of pressure that are detectable via the sensors 118 for recognition as chords by the chording module 116. Further, as previously described the relative (as opposed to absolute) positioning enables a user to input these chords anywhere along the sides of the housing 104 in this example. In one or more implementations, this may also support input of chords regardless of orientation of the computing device (e.g., up or down in this example) through leveraging other sensors of the computing device 102, such as an accelerometer as described in greater detail in relation to FIG. 8.

Figure 4:
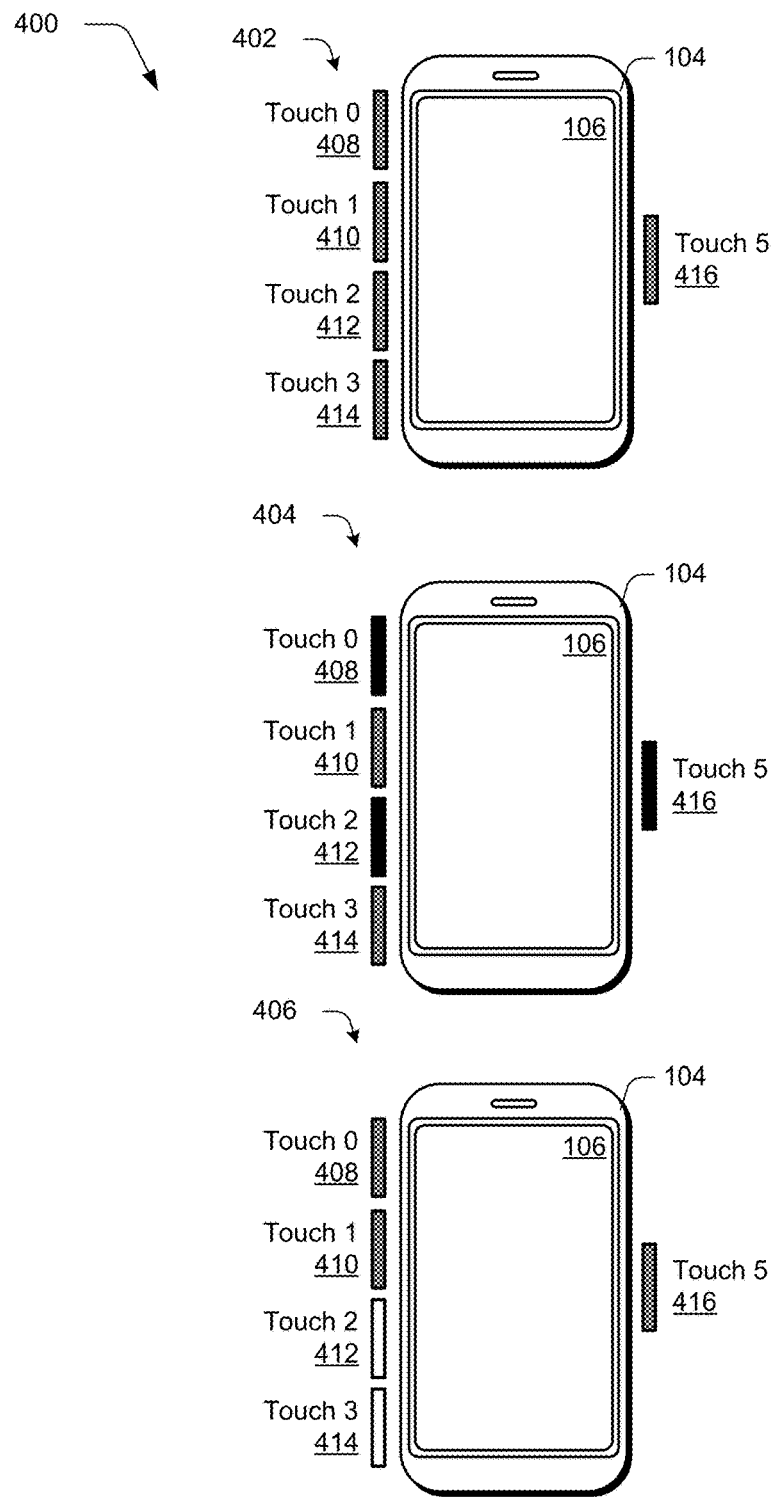
FIG. 4 depicts another example implementation showing a sequence of chords that are recognizable by the chording module of FIG. 1.

FIG. 4 depicts another example implementation 400 showing a sequence of chords that are recognizable by the chording module 116 of FIG. 1. This example is illustrated as including first, second, and third chords 402, 404, 406. As before, each of the chords includes a relative position of a user's fingers as well as indicates a likely amount of pressure applied by each of those fingers.

In the first chord 402, a user has likely grasped the housing 104 of the computing device 102 using their right hand if viewing the display device 106 and their left hand if not, e.g., the display device 104 rests against the palm of the user's right hand. Touches 0, 1, 2, 3, and 5 408-416 are detected as "light pressure." This relative positioning and corresponding amounts of pressure may then be recognized as the first chord 402 and encoded as a Base 3 value "101111."

In the second chord 404, touch 0 408 is detected as "heavy pressure," touch 1 410 as "light pressure," touch 2 412 as "heavy pressure," touch 3 414 as "light pressure," and touch 5 416 as "heavy pressure." This relative positioning and corresponding amounts of pressure may then be recognized as the second chord 404 and encoded as a Base 3 value "201212."

In the third chord 406, touches 0, 1, and 4 408, 410, 416 are detected as "light pressure" and touches 2 and 3 412, 414 as "no pressure." Thus, from touches 0, 1, and 5 408, 410, 416 the chording module 116 is able to infer that the housing 104 is being held by the user's thumb, index, and middle fingers and not being held by the ring and pinky fingers. This relative positioning and corresponding amounts of pressure may then be recognized as the third chord 406 and encoded as a Base 3 value "100011."." Taken together, the three chords are equivalent to a Base 10 value of $150788794_{10}$ ($101111\ 201212\ 100011_3$).

Figure 5:
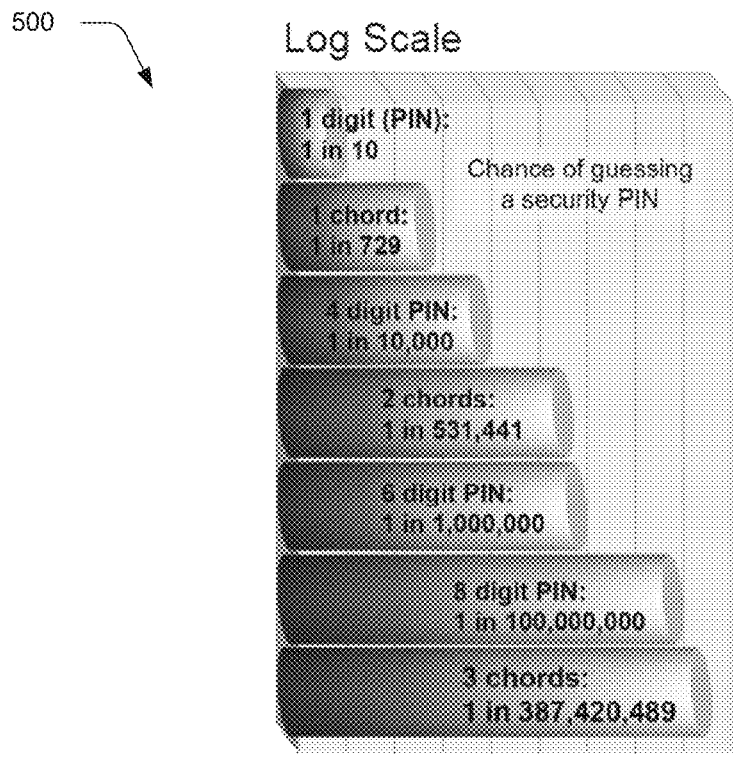
FIG. 5 is an example chart comparing chording and PINs.

Recognition of chords and sequences of chords may be utilized to support a wide range of functionality. For example, a sequence of chords may be utilized to provide improved security over traditional PINs. As shown in the example 500 of FIG. 5, for instance, there are 729 permutations of a single chord and 531,441 for two chords, which provides a lesser chance of guessing than a four digital PIN whereas three chords, though not all permutations are operable, provide a lesser chance of guessing than an eight digit PIN.

Therefore, recognition of chords may be used to authenticate a user to access functionality of the computing device 102 (e.g., unlock the device) that has increased security over conventional PINs. Further, as these inputs may be provided without viewing a user interface this technique may also protect from snooping that may be performed using conventional techniques as previously described. Other examples are also contemplated, such as to launch a communication (e.g., email, text, telephone call) to a particular contact using one or more chords, launch a particular application through use of unique combinations of chords, or initiate an emergency communication, further discussion of which may be found in the following and is shown in a corresponding figure.

Figure 6:
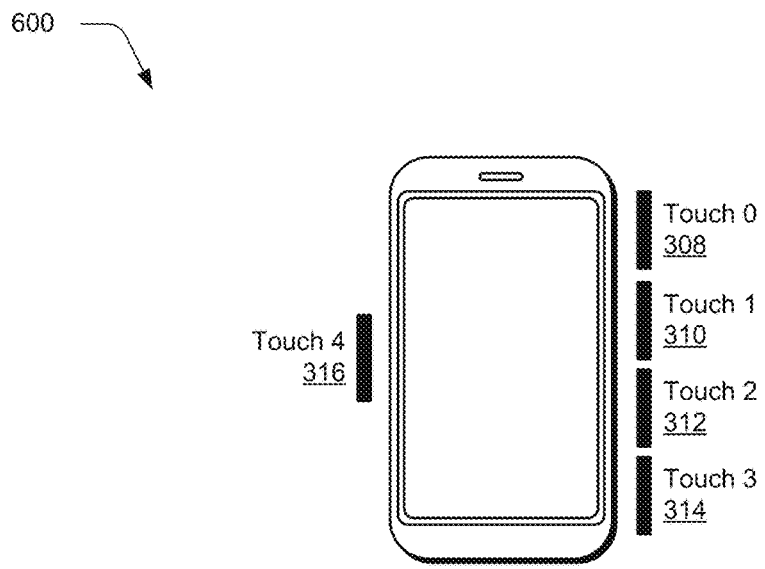
FIG. 6 depicts another example implementation showing a chord that is recognizable by the chording module of FIG. 1 to initiate emergency functionality of the computing device.

FIG. 6 depicts another example implementation 600 showing a chord that is recognizable by the chording module 116 of FIG. 1 to initiate emergency functionality of the computing device 102. In this example, a chord is shown that involves applying heavy amounts of pressure at touches 0-4 308-316. This chord, for instance, may be input by a user by gripping the housing 104 tightly and discretely by either hand for a defined amount of time. This may be recognized by the chording module 116 to initiate emergency functionality, such as to initiate a communication (e.g., dial 911, send a text or email), phone a specified emergency contact, and so on. A variety of other chords may also be utilized, such as to employ a defined sequence and so on as previously described.

Thus, a chord that is recognized as a plurality of simultaneous inputs, detected using sensors 118 disposed on the housing 104 of the computing device 104, to initiate a variety of different functionality of the computing device 102. Further, in one or more implementations these chords may be recognized regardless of the orientation of the device, whether reversed top to bottom or front to back, and thus may be utilized by a user without "looking" at the computing device 102 and may even support use of a computing device that does not have a particular "correct" orientation, e.g., the user interface may be arranged based on how the device was authenticated and/or is currently being held based on the inputs. Further discussion of these and other examples of functionality may be found in relation to the discussion of the following procedures.

Example Procedures

The following discussion describes chording techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
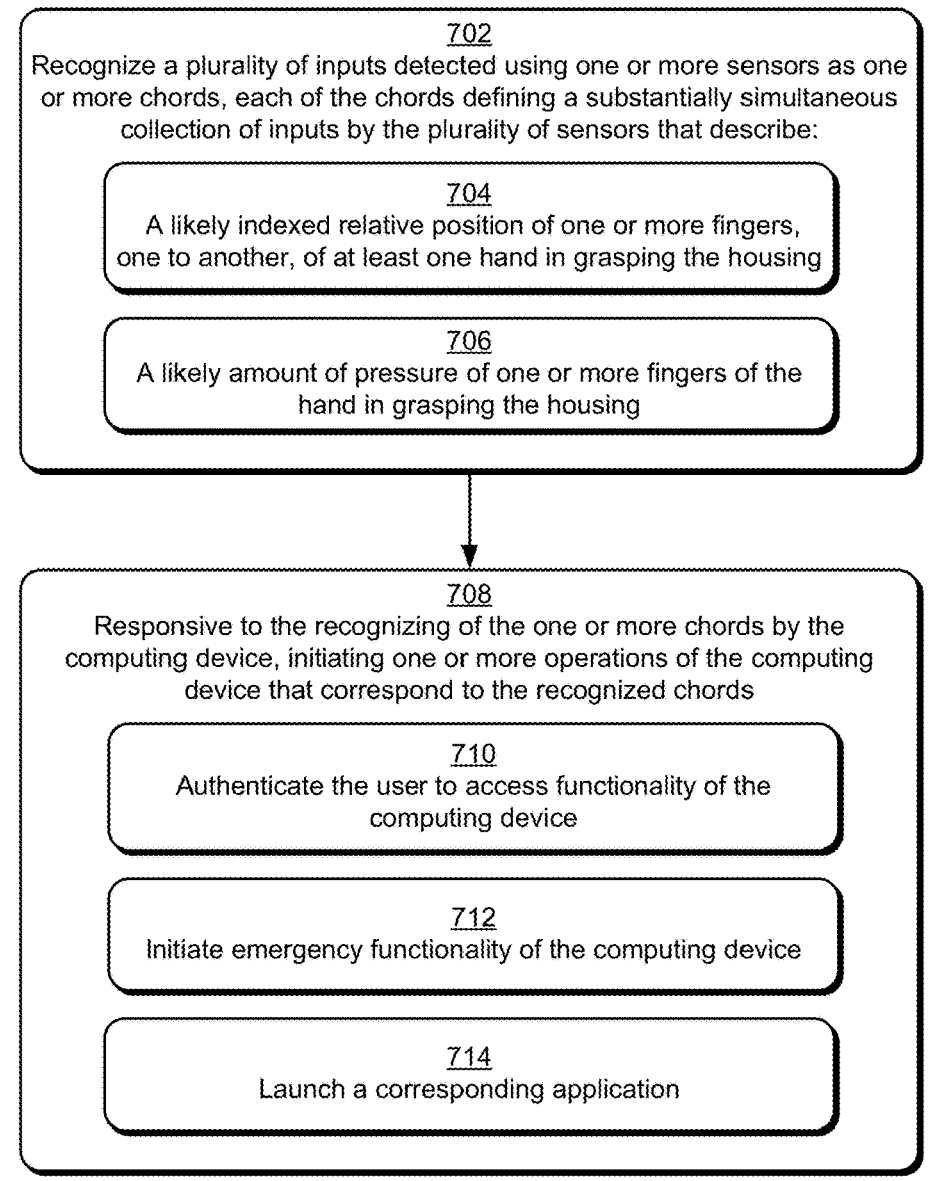
FIG. 7 is a flow diagram depicting a procedure in an example implementation in which a plurality of inputs are recognized as chords and then used to initiate operations of a computing device.

FIG. 7 depicts a procedure 700 in an example implementation in which a plurality of inputs are recognized as chords and then used to initiate operations of a computing device. A plurality of inputs detected using one or more sensors are recognized as one or more chords, each of the chords defining a substantially simultaneous collection of inputs by the plurality of sensors (block 702). The sensors 118, for instance, may be positioned on the housing 104, such as capacitive or other sensors 118 positioned along a perimeter of the display device 104. As previously described, the sensors 118 may be positioned and configured in any way that is capable of sensing a user's hand in grasping (e.g., "holding up") the computing device 102 or a part thereof.

A variety of different characteristics of the grasp may be determined from the inputs. This may include a likely relative position of one or more fingers, one to another, of at least one hand in grasping the housing (block 704). This may include determining which fingers are likely grasping the housing based on finger gaps and thresholds as further described below. The inputs may also describe a likely amount of pressure of one or more fingers of the hand in grasping the housing (block 706). For capacitive sensor 118 configurations, for instance, this may be determined by a contact area detected of the finger. Other examples are also contemplated, such as piezoelectric, thermal, strain sensors, resistive sensors, optical sensors, and so forth.

Response to the recognizing of the one or more chords by the computing device, one or more operations of the computing device are initiated that correspond to the recognized one or more chords (block 708). A variety of different operations may be initiated, such as to authenticate the user to access functionality of the computing device (block 710), initiate emergency functionality of the computing device (block 712), launch a corresponding application (block 714), or other operations, such as to initiate a communication to a predefined contact. For example, a user may define a chord sequence and use this sequence to call a friend. Further description of the recognition and use of chords may be found in the following discussion and corresponding figures.

Figure 8:
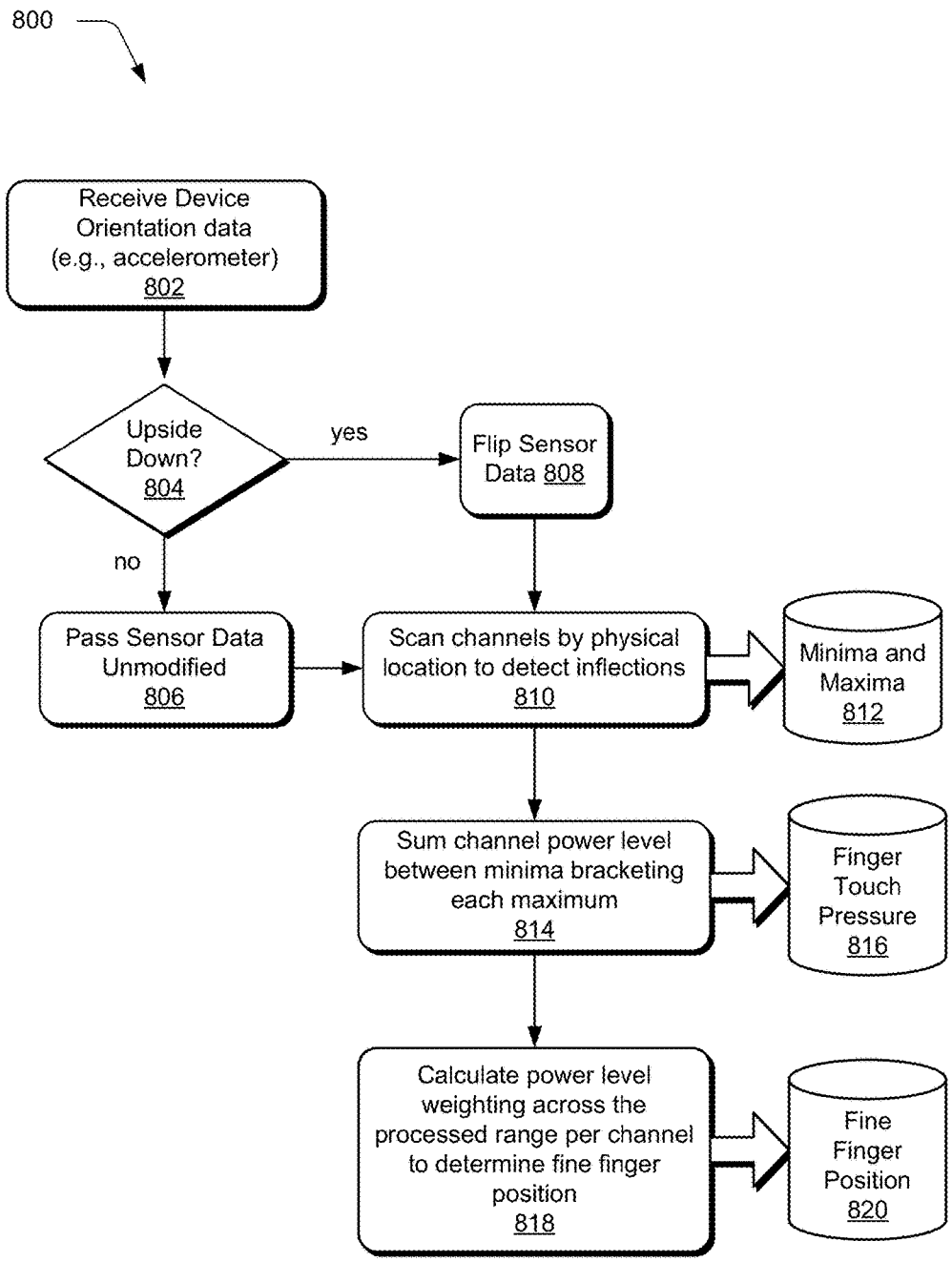
FIG. 8 is a flow diagram depicting a procedure in an example implementation in which a contact position and amount of pressure applied by the fingers of a user's hand is determined by the chording module of FIG. 1.

FIG. 8 depicts a procedure 800 in an example implementation in which a contact position and amount of pressure applied by the fingers of a user's hand is determined by the chording module 116 of FIG. 1. Device orientation data is received that describes an orientation of the device (block 802), such as from an accelerometer. A determination is then made as to an orientation of the computing device (decision block 804), such as to determine whether the computing device 102 is "upside down" or not.

If the computing device is not upside down ("no" from decision block 804), sensor data is passed unmodified (block 806) and if so ("yes" from decision block 804), the sensor data is flipped (block 808). In this way, the chord may be identified regardless of whether the computing device 102 is "right-side up" or "upside down."

Channels of the sensors 118 are scanned by physical location to detect inflections (block 810), e.g., lowest increasing, highest decreasing, and then stored as minima and maxima (block 812). Channel power level is then summed between the minima bracketing each maximum (block 814) and stored as an indication of finger touch pressure (block 816). A power level weighting is also calculated across the processed range per channel to determine fine finger position (block 818), which is then stored as the likely fine finger position (block 820). Thus, at this point a likely amount of pressure has been determined along with where these contacts occurred, which may then be utilized to determine a likely relative position of the fingers of the user's hand to each other as further described in the following.

Figure 9:
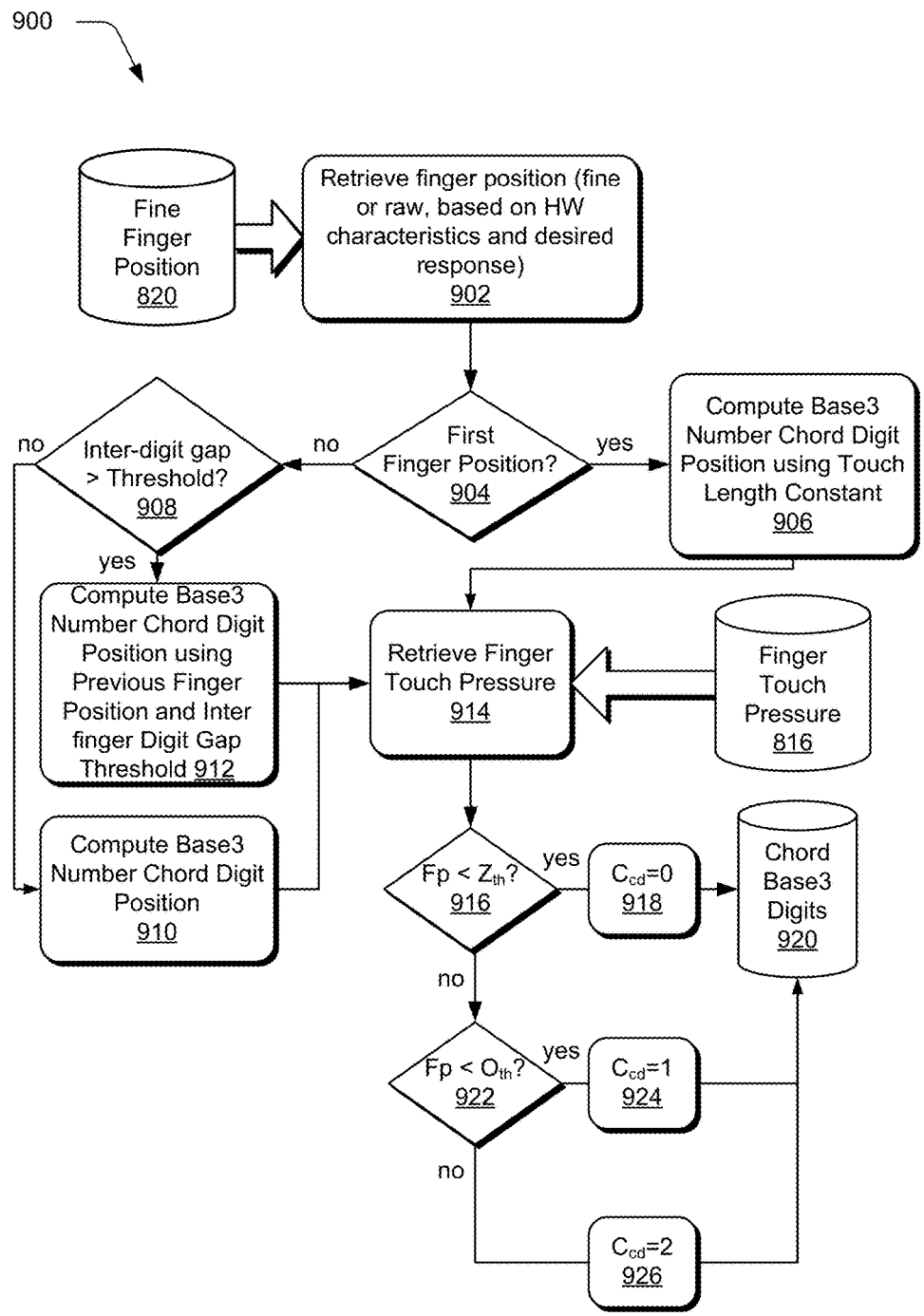
FIG. 9 is a flow diagram depicting a procedure in an example implementation in which a relative finger position is detected and used with the likely relative amount of pressure from FIG. 8 to identify a chord by the chording module of FIG. 1.

FIG. 9 depicts a procedure 900 in an example implementation in which a relative finger position is detected and used with the likely relative amount of pressure from FIG. 8 to identify a chord by the chording module 116 of FIG. 1. Finger position data is retrieved (block 902) from the stored fine finger position (block 820) from FIG. 8. A determination is then made as to whether this is the first finger position (decision block 904) for identifying a chord. If so ("yes" from decision block 904), a Base3 number chord digit position is computed using a touch length constant (block 906), which may be expressed as follows:

$$Cd = \|Fp/Tl\|$$

where "Cd" is a Base3 chord digit position integer, "Fp" is finger position, and "Tl" is a touch length constant.

If not ("no" from decision block 904), a determination is made as to whether an inter-digit gap is greater than a threshold (decision block 908) and thus may be utilized to determine whether this sensor is likely registering a gap corresponding to a lifted finger rather than the space between two fingers touching the sensor. If not ("no" from decision block 908), a Base 3 number chord digit position is computed using a previous finger position (block 910), otherwise the Base 3 digit, for example, may be computed as follows:

$$Cd = Cdp + \|(Fp - Fpp/IDG_{th})\|$$

where "Cd" is a Base3 chord digit position integer, "Fp" is finger position, "Fpp" is a previous finger position, and "$IDG_{th}$" is an inter-finger digit gap threshold.

The finger touch pressure is then retrieved (block 914) from the stored finger touch pressure (block 816) corresponding to this finger position. If the finger touch pressure "Ff" is less than a lower threshold "$Z_{th}$" ("yes" from decision block 916) a value of "$C_{cd}=0$" is assigned to that finger position corresponding to "no pressure" as previously described. This value is then saved as one of the chord Base3 Digits 920 to define the chord.

If the finger touch pressure "Fp" is not less than a lower threshold "$Z_{th}$" ("no" from decision block 916), a determination is made as to whether the finger touch pressure "Fp" is less than an upper threshold "$O_{th}$" (decision block 922). When Fp is less than an upper threshold ("yes" at decision block 922), a value of "$C_{cd}=1$" is assigned to that finger position (block 924) corresponding to "light pressure" as previously described and is then stored as the chord Base3 Digits 920. If the finger touch pressure "Fp" is greater than an upper threshold ("no" at decision block 922), a value of "$C_{cd}=2$" is assigned to that finger position corresponding to "heavy pressure" as previously described and is then stored as the chord Base3 Digits 920. In this way, relative finger position may be determined along with a likely relative amount of pressure applied by the fingers. This may be used to initiate one or more operations of the computing device 102, an example of which is described as follows and shown in a corresponding figure.

Figure 10:
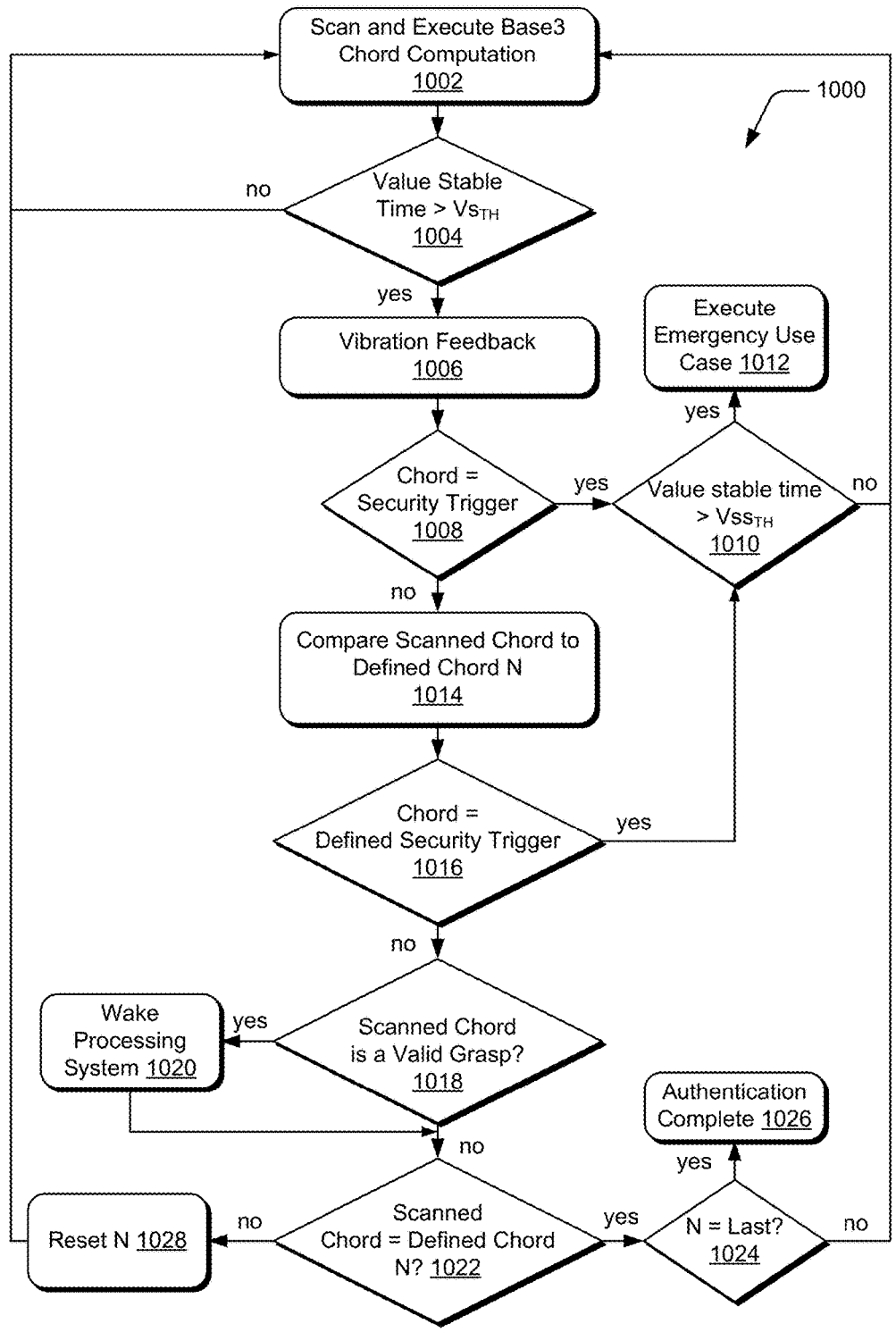
FIG. 10 is a flow diagram depicting a procedure in an example implementation in which the chord recognized in FIG. 9 is utilized to initiate one or more operations of the computing device.

FIG. 10 is a flow diagram depicting a procedure in an example implementation in which the chord recognized in FIG. 9 is utilized to initiate one or more operations of the computing device. A process begins by scanning and executing a Base3 chord computation (block 1002). A determination is made as to whether the values received from the inputs are stable over a threshold amount of time "$Vs_{th}$" (decision block 1004). If not ("no" from decision block 1004), the scanning continues (block 1002). If so ("yes" from decision block 1004) vibration feedback (block 1006) or other feedback (e.g., sound, haptic, or otherwise) is given to indicate that a potential chord is recognized.

A determination is then made as to whether the chord is the security trigger (decision block 1008). If so ("yes" from decision block 1008), another determination is made as to whether the value stable time is greater than another threshold $Vss_{TH}$ (decision block 1010). If so ("yes" from decision block 1010), an emergency call is executed (block 1012) and if not ("no" from decision block 1010) the scanning continues (block 1002).

If the chord does not equal the security trigger ("no" from decision block 1008), the scanned chord is compared to one of a plurality of defined chords "N" (block 1014). If the scanned chord is determined to equal an alternatively defined security trigger ("yes" from decision block 1016) then the procedure 1000 returns to block 1010 and if not, a determination is made as to whether the scanned chord is a valid grasp (decision block 1018).

If so ("yes" from decision block 1018), the processing system 108 is woken (block 1020) by the Chording Module 116/122 and if not ("no" from decision block 1018), a determination is made as to whether the scanned chord equals the defined chord "N" (decision block 1022). If so ("yes" from decision block 1022), a determination is made as to whether chord "N" is the last of the available chords (decision block 1024). If so ("yes" from decision block 1024) authentication is completed (block 1026). If not, scanning continues (block 1002). If the scanned chord does not equal the defined chord "N" ("no" from decision block 1022), "N" is reset and the scanning continuing (block 1002). In this way, the chording module 116 may recognize chords and initiate operations that correspond to the chords.

Example System and Device

Figure 11:
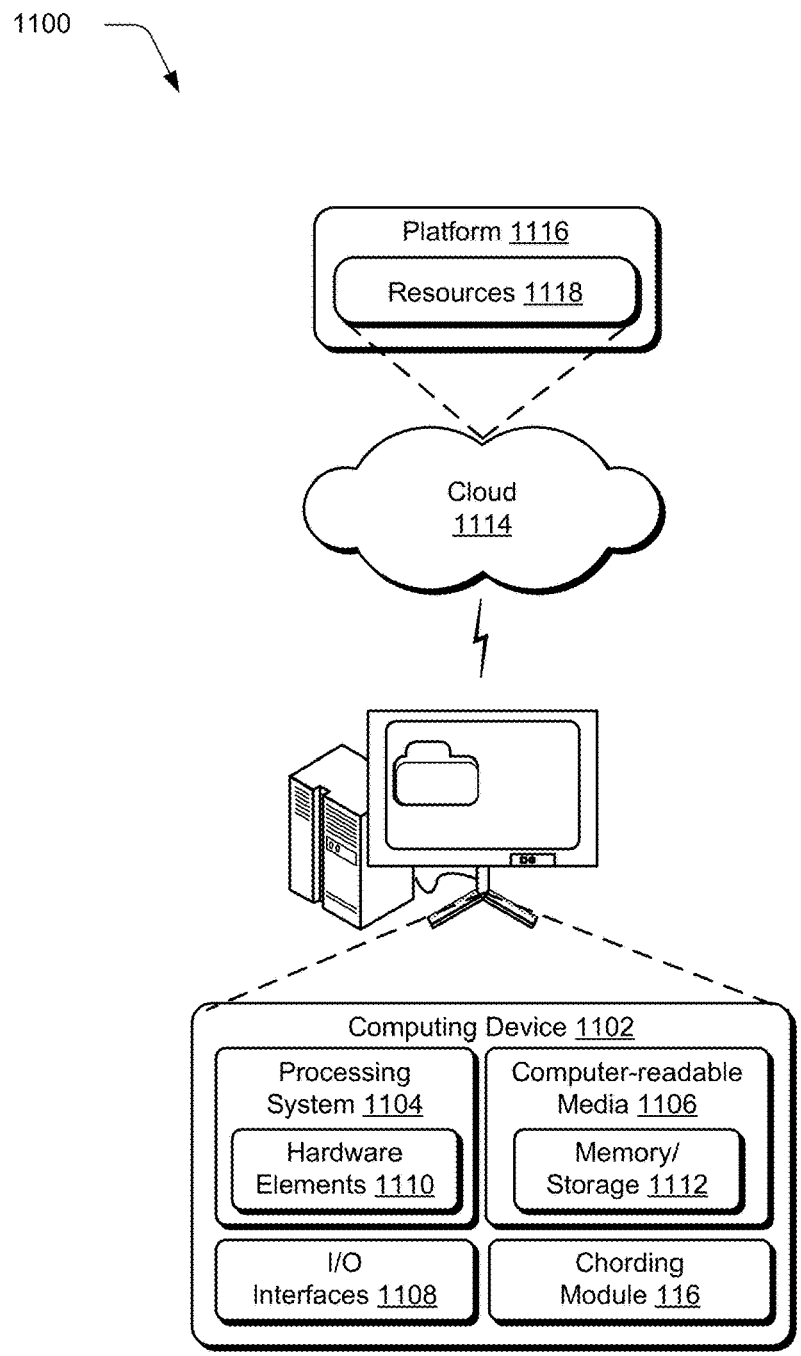
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the chording module 116. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   determining, by a computing device, based on a first plurality of inputs received from at least one sensor, a relative position of and an amount of pressure applied by each of a first plurality of fingers of a user who interacts with the computing device, wherein the at least one sensor is disposed on at least a portion of a housing of the computing device;
   identifying, by the computing device, based on the relative position of and the amount of pressure applied by each of the first plurality of fingers for at least a first defined amount of time, a first chord in a sequence of chords, wherein the first chord defines a first substantially simultaneous collection of the first plurality of inputs received from the at least one sensor;
   after identifying the first chord, determining, by the computing device, based on a second plurality of inputs received from the at least one sensor, a relative position of and an amount of pressure applied by each of a plurality of fingers of the user who interacts with the computing device;
   identifying, by the computing device, based on the relative position of and the amount of pressure applied by each of the second plurality of fingers for at least a second defined amount of time, a second chord in the sequence of chords, wherein the second chord defines a second substantially simultaneous collection of the second plurality of inputs received from the at least one sensor, and wherein the second chord is different than the first chord; and responsive to determining that the first and second chords in the sequence of chords are associated with a particular operation of the computing device, initiating, by the computing device, the particular operation.

2. The method of claim 1, further comprising:

determining, by the computing device, an orientation of the housing the computing device in three-dimensional space, wherein initiating the particular operation is further responsive to determining whether the orientation of the housing is a first orientation or a second orientation different from the first orientation.

3. The method of claim 2, further comprising:

responsive to determining that the orientation of the housing is the first orientation, modifying at least one of the first plurality of inputs or the second plurality of inputs.

4. The method of claim 2, further comprising:

responsive to determining that the orientation of the housing is the second orientation, processing the first plurality of inputs and the second plurality of inputs unmodified.

5. The method of claim 2, wherein the first orientation results in a particular side of the housing as being oriented substantially upward relative to the user, and wherein the second orientation results in the particular side of the housing as not being oriented substantially upward relative to the user.

6. The method of claim 1, further comprising:

determining, by the computing device, that the first and second chords in the sequence of chords correspond to stored credentials of the user, wherein initiating the particular operation comprises authenticating, by the computing device, the user to access functionality of the computing device.

7. The method of claim 6, further comprising:

responsive to authenticating the user, unlocking the computing device and permitting access to one or more applications of the computing device.

8. The method of claim 6, further comprising:

responsive to authenticating the user, waking the computing device from a sleep or suspended state.

9. The method of claim 1, wherein initiating the particular operation comprises one of launching an application, unlocking the computing device, or initiating emergency functionality.

10. A system comprising:

a housing;

at least one sensor disposed on at least a portion of the housing; and one or more processors configured to:

determine, based on a first plurality of inputs received from the at least one sensor, a relative position of and an amount of pressure applied by each of a first plurality of fingers of a user who interacts with the computing device;

identify, based on the relative position of and the amount of pressure applied by each of the first plurality of fingers for at least a first defined amount of time, a first chord in a sequence of chords, wherein the first chord defines a first substantially simultaneous collection of the first plurality of inputs received from the at least one sensor;

after identifying the first chord, determine, based on a second plurality of inputs received from the at least one sensor, a relative position of and an amount of pressure applied by each of a second plurality of fingers of the user who interacts with the computing device;

identify, based on the relative position of and the amount of pressure applied by each of the second plurality of fingers for at least a second defined amount of time, a second chord in the sequence of chords, wherein the second chord defines a second substantially simultaneous collection of the second plurality of inputs received from the at least one sensor, and wherein the second chord is different than the first chord; and responsive to determining that the first and second chords in the sequence of chords are associated with a particular operation of the computing device, initiate the particular operation.

11. The system of claim 10, further comprising a display device, wherein the one or more processors are further configured to:

determine an orientation of the housing the computing device in three-dimensional space; and determine whether the orientation of the housing is a first orientation or a second orientation different from the first orientation, wherein the display device of the computing device is viewable by the user when the housing is in the first orientation, and wherein the display device is not viewable by the user when the housing is in the second orientation, wherein the one or more processors are configured to initiate the particular operation further responsive to determining whether the orientation of the housing is the first orientation or the second orientation.

12. The system of claim 11, wherein the at least one sensor is not part of the display device.

13. The system of claim 11, wherein the one or more processors are further configured to:

responsive to determining that the orientation of the housing is the first orientation, modify at least one of the first plurality of inputs or the second plurality of inputs.

14. The system of claim 10, wherein the one or more processors are further configured to:

determine that the first and second chords in the sequence of chords correspond to stored credentials of the user, wherein the one or more processors are configured to initiate the particular operation at least by authenticating the user to access functionality of the computing device.

15. The system of claim 14, wherein the one or more processors are further configured to:

responsive to authenticating the user, unlock the computing device and permitting access to one or more applications of the computing device.

16. The system of claim 14, wherein the one or more processors are further configured to:

responsive to authenticating the user, wake the computing device from a sleep or suspended state.

17. The system of claim 10, wherein the one or more processors are configured to initiate the particular operation at least by one or more of launching an application, unlocking the computing device, or initiating emergency functionality.

\* \* \* \* \*